United States Patent
Nukui et al.

(10) Patent No.: US 6,470,206 B2
(45) Date of Patent: Oct. 22, 2002

(54) ADDITION TOMOGRAPHIC IMAGE PRODUCING METHOD AND X-RAY CT APPARATUS

(75) Inventors: Masatake Nukui, Tokyo (JP); Akihiko Nishide, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/898,227

(22) Filed: Jul. 3, 2001

(65) Prior Publication Data

US 2002/0075991 A1 Jun. 20, 2002

(30) Foreign Application Priority Data

Aug. 31, 2000 (JP) .................... 2000-262057

(51) Int. Cl.$^7$ ................ A61B 5/05
(52) U.S. Cl. ................ 600/425
(58) Field of Search .............. 600/407, 425, 600/426, 427, 428, 429; 382/128; 128/920

(56) References Cited

U.S. PATENT DOCUMENTS

| | | | | |
|---|---|---|---|---|
| 5,247,934 A | * | 9/1993 | Wehrli et al. | 600/410 |
| 5,262,945 A | * | 11/1993 | DeCarli et al. | 600/410 |
| 5,459,524 A | * | 10/1995 | Cooper | 348/498 |
| 5,550,582 A | * | 8/1996 | Takasugi et al. | 348/29 |
| 5,572,330 A | * | 11/1996 | Sasanuma | 347/133 |
| 6,023,497 A | * | 2/2000 | Takahashi et al. | 378/53 |
| 6,038,265 A | * | 3/2000 | Pan et al. | 332/119 |
| 6,086,535 A | * | 7/2000 | Ishibashi et al. | 600/439 |
| 6,203,777 B1 | * | 3/2001 | Schroder | 424/9.322 |
| 6,389,310 B1 | * | 5/2002 | Demonceau et al. | 600/509 |
| 6,400,978 B1 | * | 6/2002 | Teicher et al. | 324/307 |

\* cited by examiner

*Primary Examiner*—Teresa Walberg
*Assistant Examiner*—Daniel Robinson
(74) *Attorney, Agent, or Firm*—Moonray Kojima (57) ABSTRACT

In order to eliminate the adverse effect of the partial volume in producing an addition tomographic image by adding a plurality of tomographic images having different slice thicknesses, an offset correction and a sensitivity correction are applied to row data $Ij$ (j=1–J) from which respective tomographic images $Gj$ can be reconstructed; addition data $K$ is generated by performing a weighted addition on the row data $Ij$ with a weight $Tj/\Sigma Tj$ corresponding to the slice thickness $Tj$; logarithm processing is applied to the addition data $K$; and then the addition data is subjected to reconstruction to produce an addition tomographic image $G$.

24 Claims, 6 Drawing Sheets

Fig. 7 ized to "1".

ADDITION TOMOGRAPHIC IMAGE PRODUCING METHOD AND X-RAY CT APPARATUS

BACKGROUND OF THE INVENTION

The present invention relates to an addition tomographic image producing method and an X-ray CT apparatus, and more particularly to an addition tomographic image producing method and an X-ray CT apparatus which, when an addition tomographic image is produced by adding a plurality of tomographic images, can produce an addition tomographic image not adversely affected by the partial volume effect even when the slice thicknesses of the tomographic images are different.

1. First Example (Prior Art)

Figure 1:
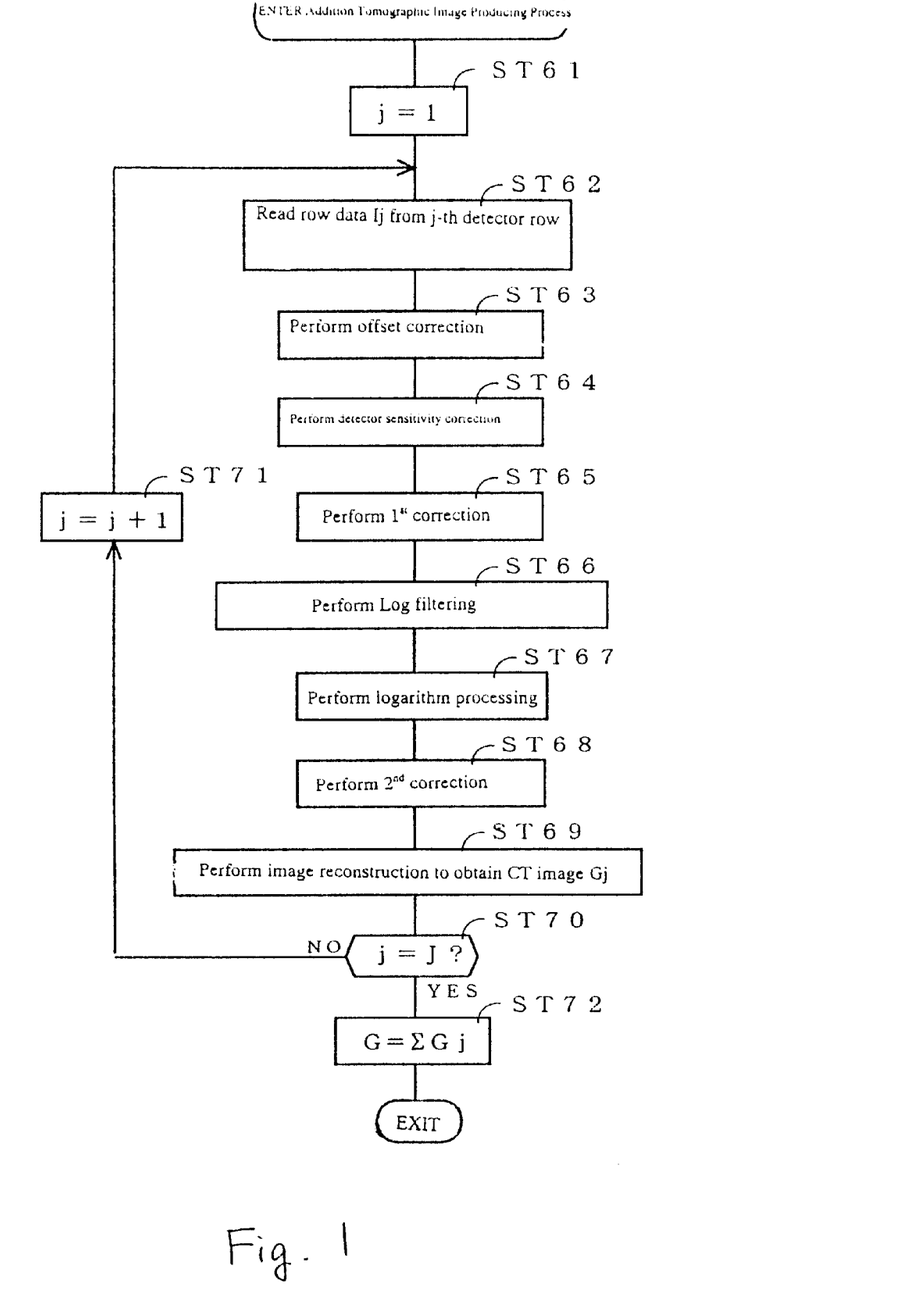
FIG. 1 is a flow chart of an addition tomographic image producing process in accordance with a first example of the conventional techniques.

FIG. 1 is a flow chart showing a first example of a conventional addition tomographic image producing process in a conventional X-ray CT apparatus comprising a multi X-ray detector having a plurality of detector rows.

In Step ST61, an image index counter j is initialized to "1".

In Step ST62, row data Ij is read from a j-th detector row in the multi X-ray detector.

In Step ST63, an offset correction is performed. Specifically, an offset is subtracted from the row data Ij of the j-th detector row. For brevity of notation, the row data from which the offset has been subtracted will also be designated as In Step ST64, a detector sensitivity correction is performed. Specifically, the row data Ij of the j-th detector row is divided by an entering X-ray dose Tj·Io, wherein Tj is the slice thickness of the j-th detector row, and Io is the entering X-ray dose per unit thickness.

In Step ST65, a first correction is applied to the row data Ij/(Tj·Io) subjected to the detector sensitivity correction. The first correction is a reference correction. For brevity of notation, the row data subjected to the first correction will also be designated as Ij/(Tj·Io).

In Step ST66, if the value of a certain channel in the row data Ij/(Tj·Io) subjected to the first correction is not more than a predefined threshold, then the value is replaced by the average value of one or more adjacent channels. This processing will be referred to as Log filtering hereinbelow.

In Step ST67, logarithm processing is performed. Specifically, −Log{Ij/(Tj·Io)} is calculated.

In Step ST68, a second correction is applied to the row data subjected to the logarithm processing. The second correction is at least one of a beam hardening correction, a water correction, a body motion correction and a helical correction.

In Step ST69, filtering and a back projection operation are applied to the row data subjected to the second correction to obtain a CT image Gj.

In Steps ST70 and ST71, Steps ST62–ST69 are repeated for j=2–J. Thus, CT images GI–GJ are reconstructed.

In Step ST72, the CT images GI–GJ are simply added to obtain an addition CT image G.

2. Second Example (Prior Art)

Figure 2:
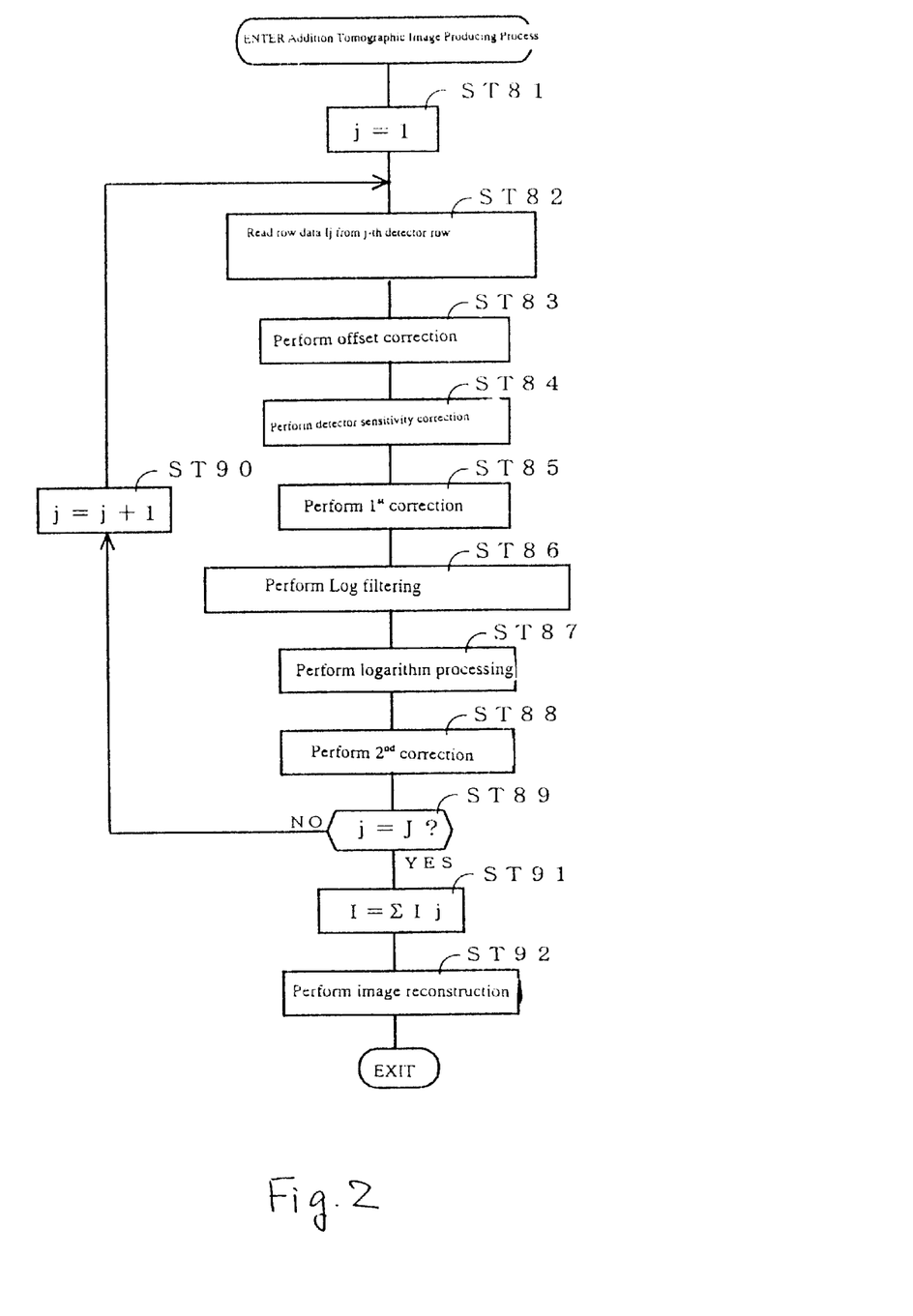
FIG. 2 is a flow chart of an addition tomographic image producing process in accordance with a second example of the conventional techniques.

FIG. 2 is a flow chart showing a second example of a conventional addition tomographic image producing process in a conventional X-ray CT apparatus comprising a multi X-ray detector having a plurality of detector rows.

In Step ST81, an image index counter j is initialized to "1".

In Step ST82, row data Ij is read from a j-th detector row in the multi X-ray detector.

In Step ST83, an offset correction is performed. Specifically, an offset is subtracted from the row data Ij of the j-th detector row. For brevity of notation, the row data from which the offset has been subtracted will also be designated as Ij.

In Step ST84, a detector sensitivity correction is performed. Specifically, the row data Ij of the j-th detector row is divided by an entering X-ray dose Tj·Io.

In Step ST85, a first correction is applied to the row data Ij/(Tj·Io) subjected to the detector sensitivity correction. The first correction is a reference correction. For brevity of notation, the row data subjected to the first correction will also be designated as Ij/(Tj·Io).

In Step ST86, Log filtering is performed.

In Step ST87, logarithm processing is performed. Specifically, −Log{Ij/(Tj·Io)} is calculated.

In Step ST88, a second correction is applied to the row data subjected to the logarithm processing. The second correction is at least one of a beam hardening correction, a water correction, a body motion correction and a helical correction.

In Steps ST89 and ST90, Steps ST82–ST88 are repeated for j=2–J. Thus, row data I'1–I'J subjected to the second correction are obtained.

In Step ST91, the row data I'1–I'J subjected to the second correction are simply added to obtain addition data I, that is:

$$I = \Sigma I'j$$

In Step ST92, filtering and a back projection operation are applied to the addition data I to obtain an addition CT image G.

In the first and second examples of the conventional technique, when the slice thicknesses of the detector rows are equal, there is no significant problem in obtaining the addition CT image G.

However, when the slice thicknesses are different, an adverse effect of the partial volume appears on the addition CT image G. Specifically, the different slice thicknesses produce different partial volume effects, resulting in different CT values for the same substance. In other words, discontinuity arises in the CT values of the same substance. Accordingly, the CT values of an object which should appear to be uniform appear to partially vary on the addition CT image G.

SUMMARY OF THE INVENTION

It is therefore an object of the present invention to provide an addition tomographic image producing method and an X-ray CT apparatus which, when an addition tomographic image is produced by adding a plurality of tomographic images, can produce an addition tomographic image not adversely affected by the partial volume effect even when the slice thicknesses of the tomographic images are different.

In accordance with a first aspect, the present invention provides an addition tomographic image producing method comprising the steps of: applying an offset correction and a sensitivity correction to data Ij (j=1–J) from which respective tomographic images Gj can be reconstructed; generating addition data by performing a weighted addition on the data Ij with a weight Tj/ΣTj corresponding to the slice thickness Tj; applying logarithm processing to the addition data; and performing reconstruction on the addition data to produce an addition tomographic image G.

According to the addition tomographic image producing method in the first aspect, the addition data is generated by performing a weighted addition on the data Kj subjected to the sensitivity correction with a weight Tj/ΣTj corresponding to the slice thickness Tj. Specifically, when the addition data is represented as K, $$K=\Sigma\{(Tj/\Sigma Tj)\cdot Kj\}$$

As explained further later, K is equivalent to sensitivity-corrected data of one slice having a slice thickness of ΣTj. Therefore, no adverse effect of the partial volume will appear on the addition tomographic image G produced by adding a plurality of tomographic images Gj having different slice thicknesses.

In accordance with a second aspect, the present invention provides the addition tomographic image producing method of the aforementioned configuration, wherein the tomographic image Gj is an X-ray CT image, and the data Ij is row data.

According to the addition tomographic image producing method in the second aspect, the addition data K is generated by performing a weighted addition on the row data Kj subjected to the sensitivity correction with a weight Tj/ΣTj corresponding to the slice thickness Tj. Specifically, $$K=\Sigma\{(Tj/\Sigma Tj)\cdot Kj\}$$

As described later, K is equivalent to sensitivity-corrected row data of one slice having a thickness of ΣTj . Therefore, no adverse effect of the partial volume will appear on the addition tomographic image G produced by adding a plurality of X-ray CT images Gj having different slice thicknesses.

In accordance with a third aspect, the present invention provides the addition tomographic image producing method of aforementioned configuration, wherein the row data is that obtained by each detector row in a multi X-ray detector.

According to the addition tomographic image producing method in the third aspect, a tomographic image can be produced from row data obtained by detector rows in a multi X-ray detector as if it were reconstructed from row data obtained by one detector row which is a combination of those detector rows.

In accordance with a fourth aspect, the present invention provides the addition tomographic image producing method of aforementioned configuration, comprising the step of applying a reference correction to the row data before or after the sensitivity correction, or to the addition data before the logarithm processing According to the addition tomographic image producing method in the fourth aspect, when applied to the row data before or after the sensitivity correction, the reference correction may be performed in an ordinary way. When applied to the addition data before the logarithm processing, the reference correction needs to be performed only once.

In accordance with a fifth aspect, the present invention provides the addition tomographic image producing method of aforementioned configuration, comprising the step of applying at least one of a beam hardening correction, a water correction, a body motion correction and a helical correction to the addition data subjected to the logarithm processing.

According to the addition tomographic image producing method in the fifth aspect, since the several corrections are applied to the addition data, the corrections need to be performed only once.

In accordance with a sixth aspect, the present invention provides the addition tomographic image producing method of aforementioned configuration, comprising the step of, when a value of a certain channel in the row data before the logarithm processing is not more than a predefined threshold, replacing the value by an average value of one or more adjacent channels.

According to the addition tomographic image producing method in the sixth aspect, when an abnormal value is contained in the row data, the value can be removed before the logarithm processing.

In accordance with a seventh aspect, the present invention provides the addition tomographic image producing method of aforementioned configuration, wherein the step of performing reconstruction comprises filtering and a back projection operation.

According to the addition tomographic image producing method in the seventh aspect, a tomographic image can be reconstructed by a filtered back projection technique.

In accordance with a eighth aspect, the present invention provides an addition tomographic image producing method comprising the steps of: applying an offset correction to data Ij (j=1–J) from which respective tomographic images Gj can be reconstructed; generating addition data I by simply adding the data Ij; applying a sensitivity correction and logarithm processing to the addition data I; and performing reconstruction on the addition data to produce an addition tomographic image G.

According to the addition tomographic image producing method in the eighth aspect, the addition data I is generated by simply adding the data Ij subjected to only the offset correction and before they are subjected to the sensitivity correction. Specifically, $$I=\Sigma Ij.$$

I is equivalent to data of one slice having a slice thickness of ΣTj. Therefore, no adverse effect of the partial volume will appear on the addition image G produced by adding a plurality of tomographic images Gj having different slice thicknesses.

Moreover, since the offset correction is applied to the data Ij (j=1–J), the processing may be the same as the ordinary one.

In accordance with a ninth aspect, the present invention provides an addition tomographic image producing method comprising the steps of: generating addition data I by simply adding data Ij (j=1–J) from which respective tomographic images Gj can be reconstructed; applying an offset correction, a sensitivity correction and logarithm processing to the addition data I; and performing reconstruction on the addition data to produce an addition tomographic image G.

According to the addition tomographic image producing method in the ninth aspect, the addition data I is generated by simply adding the data Ij before they are subjected to the offset correction and the sensitivity correction. Specifically, $$I=\Sigma Ij.$$

I is equivalent to data of one slice having a slice thickness of ΣTj. Therefore, no adverse effect of the partial volume will appear on the addition tomographic image G produced by adding a plurality of tomographic images Gj having different slice thicknesses.

Moreover, since the offset correction is applied to the addition data I, the offset correction needs to be performed only once, although offset values for data Ij need to be added beforehand.

In accordance with a tenth aspect, the present invention provides the addition tomographic image producing method of aforementioned configuration, wherein the data Ij is row data obtained by each detector row in a multi X-ray detector.

According to the addition tomographic image producing method in the tenth aspect, a tomographic image can be produced from row data obtained by detector rows in a multi X-ray detector as if it were reconstructed from row data obtained by one detector row which is a combination of those detector rows.

In accordance with a eleventh aspect, the present invention provides the addition tomographic image producing method of aforementioned configuration, comprising the step of applying a reference correction to the addition data I before the sensitivity correction, or after the sensitivity correction and before the logarithm processing.

According to the addition tomographic image producing method in the eleventh aspect, when applied to the row data before or after the sensitivity correction, the reference correction may be performed in an ordinary way. When applied to the addition data I before the logarithm processing, the reference correction needs to be performed only once.

In accordance with a twelfth aspect, the present invention provides the addition tomographic image producing method of aforementioned configuration, comprising the step of applying at least one of a beam hardening correction, a water correction, a body motion correction and a helical correction to the addition data subjected to the logarithm processing.

According to the addition tomographic image producing method in the twelfth aspect, since the several corrections are applied to the addition data I, the corrections need to be performed only once.

In accordance with a thirteenth aspect, the present invention provides the addition tomographic image producing method of aforementioned configuration, comprising the step of, when a value of a certain channel in the addition data before the logarithm processing is not more than a predefined threshold, replacing the value by an average value of one or more adjacent channels.

According to the addition tomographic image producing method in the thirteenth aspect, when an abnormal value is contained in the row data, the value can be removed before the logarithm processing.

In accordance with a fourteenth aspect, the present invention provides the addition tomographic image producing method of aforementioned configuration, wherein the step of performing reconstruction comprises filtering and a back projection operation.

According to the addition tomographic image producing method in the fourteenth aspect, a tomographic image can be reconstructed by a filtered back projection technique.

In accordance with a fifteenth aspect, the present invention provides an X-ray CT apparatus comprising a multi X-ray detector having a plurality of detector rows, comprising: sensitivity correction means for applying an offset correction and a sensitivity correction to row data Ij (j=1–J) obtained by the detector rows; addition data generating means for generating addition data I by performing a weighted addition on the row data subjected to the sensitivity correction with a weight Tj/ΣTj corresponding to the slice thickness Tj; logarithm processing means for applying logarithm processing to the addition data I; and reconstruction means for applying filtering and a back projection operation to the addition data subjected to the logarithm processing.

According to the X-ray CT apparatus in the fifteenth aspect, the addition tomographic image producing method of the second aspect can be suitably practiced.

In accordance with a sixteenth aspect, the present invention provides the X-ray CT apparatus of the aforementioned configuration, comprising first correcting means for applying a reference correction to the row data before or after the sensitivity correction, or to the addition data I before the logarithm processing.

According to the X-ray CT apparatus in the sixteenth aspect, the addition tomographic image producing method of the fourth aspect can be suitably practiced.

In accordance with a seventeenth aspect, the present invention provides the X-ray CT apparatus of the aforementioned configuration, comprising second correcting means for applying at least one of a beam hardening correction, a water correction, a body motion correction and a helical correction to the addition data subjected to the logarithm processing.

According to the X-ray CT apparatus in the seventeenth aspect, the addition tomographic image producing method of the fifth aspect can be suitably practiced.

In accordance with an eighteenth aspect, the present invention provides an X-ray CT apparatus comprising a multi X-ray detector having a plurality of detector rows, comprising: offset correcting means for applying an offset correction to row data Ij (j=1–J) obtained by the detector rows; addition data generating means for generating addition data I by simply adding the row data subjected to the offset processing; sensitivity correcting means for applying a sensitivity correction to the addition data I; logarithm processing means for applying logarithm processing to the addition data subjected to the sensitivity correction; and reconstruction means for applying filtering and a back projection operation to the addition data subjected to the logarithm processing.

According to the X-ray CT apparatus in the eighteenth aspect, the addition tomographic image producing method of the eighth aspect can be suitably practiced.

In accordance with a nineteenth aspect, the present invention provides an X-ray CT apparatus comprising a multi X-ray detector having a plurality of detector rows, comprising: addition data generating means for generating addition data I by simply adding row data Ij (j=1–J) obtained by the detector rows; offset correcting means for applying an offset correction to the addition data I; sensitivity correcting means for applying a sensitivity correction to the addition data subjected to the offset processing; logarithm processing means for applying logarithm processing to the addition data subjected to the sensitivity correction; and reconstruction means for applying filtering and a back projection operation to the addition data subjected to the logarithm processing.

According to the X-ray CT apparatus in the nineteenth aspect, the addition tomographic image producing method of the ninth aspect can be suitably practiced.

In accordance with a twentieth aspect, the present invention provides the X-ray CT apparatus of the aforementioned configuration, comprising first correcting means for applying a reference correction to the addition data before the sensitivity correction, or after the sensitivity correction and before the logarithm processing.

According to the X-ray CT apparatus in the twentieth aspect, the addition tomographic image producing method of the eleventh aspect can be suitably practiced.

In accordance with a twenty-first aspect, the present invention provides the X-ray CT apparatus of the aforementioned configuration, comprising second correcting means for applying at least one of a beam hardening correction, a water correction, a body motion correction and a helical correction to the addition data subjected to the logarithm processing.

According to the X-ray CT apparatus in the twenty-first aspect, the addition tomographic image producing method of the twelfth aspect can be suitably practiced.

Thus, according to the addition tomographic image producing method and the X-ray CT apparatus of the present invention, when an addition tomographic image is produced by adding a plurality of tomographic images, an addition tomographic image can be produced which is not adversely affected by the partial volume effect even when the slice thicknesses of the tomographic images are different.

Further objects and advantages of the present invention will be apparent from the following description of the preferred embodiments of the invention as illustrated in the accompanying drawings.

DETAILED DESCRIPTION OF THE INVENTION

The present invention will now be described in more detail with reference to embodiments of the invention shown in the accompanying drawings. It should be noted, however, that the present invention is not limited these embodiments.

First Embodiment

Figure 3:
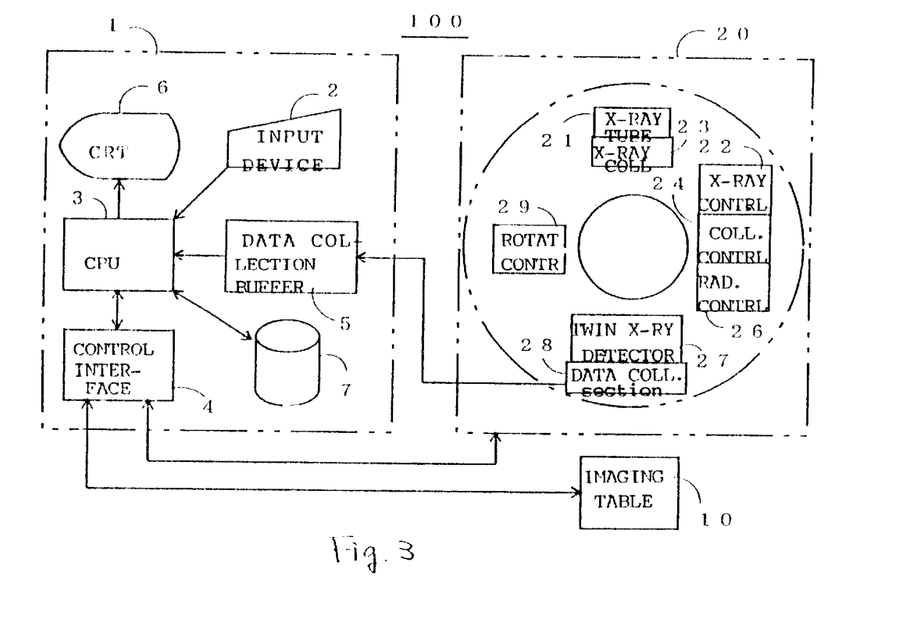
FIG. 3 is a block diagram of an X-ray CT apparatus in accordance with an embodiment of the present invention.

FIG. 3 is a block diagram of an X-ray CT apparatus 100 in accordance with a first embodiment of the present invention.

The X-ray CT apparatus 100 comprises an operating console 1, an imaging table 10 and a scan gantry 20.

The operating console 1 comprises an input device 2 for receiving an instruction or information input supplied by a human operator; a central processing apparatus 3 for executing a scan process, image reconstruction process, addition tomographic image producing process and the like; a control interface 4 for exchanging control signals and the like with the imaging table 10 and the scan gantry 20; a data collection buffer 5 for collecting data acquired at the scan gantry 20; a CRT 6 for displaying an X-ray image reconstructed from the data; and a storage device 7 for storing programs, data and the X-ray image.

The scan gantry 20 comprises an X-ray tube 21, an X-ray controller 22, a collimator 23, a collimator controller 24, a rotation controller 26 for rotating the X-ray tube 21 etc. around an isocenter (designated as IC in FIG. 4), and a twin X-ray detector 27 having two rows of detectors.

Figure 4:
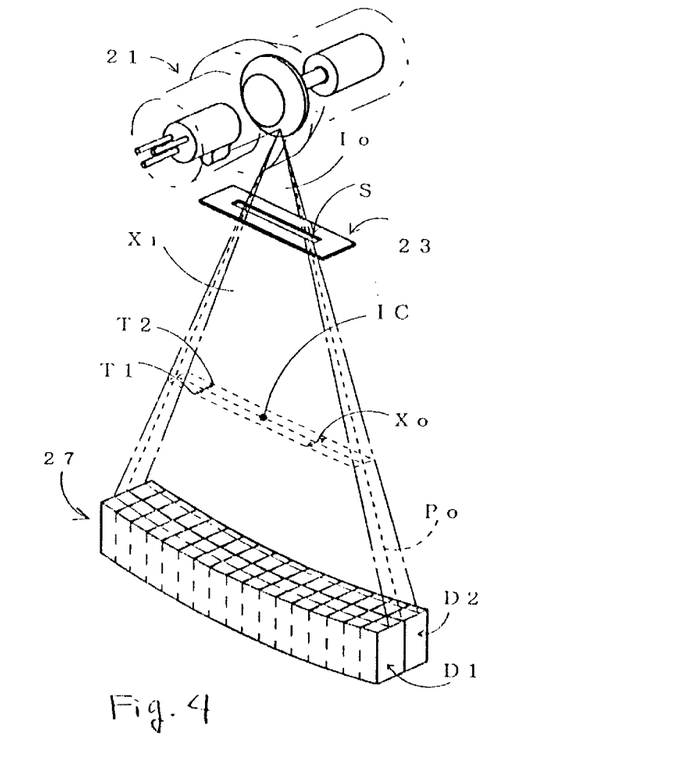
FIG. 4 is a schematic view illustrating an X-ray tube, a collimator and a twin X-ray detector.

FIG. 4 is a schematic view illustrating the X-ray tube 21, collimator 23 and twin X-ray detector 27.

X-rays Io emitted from the X-ray tube 21 are formed into a flat X-ray beam Xr after passing through an aperture S of the collimator 23, and impinge upon first and second detector rows D1 and D2 of the twin X-ray detector 27.

The opening width and position of the aperture S of the collimator 23 is regulated by the collimator controller 24 based on instructions from the central processing apparatus 3.

Reference symbol Po designates an imaginary boundary line between a portion of the X-ray beam Xr which impinges upon the first detector row D1 and a portion which impinges upon the second detector row D2.

The width of the X-ray beam Xr at the isocenter IC is referred to as X-ray beam width Xo. The width of a portion of the X-ray beam width Xo which impinges upon the first detector row D1 is a first slice thickness T1 and the width of a portion which impinges upon the second detector row D2 is a second slice thickness T2.

Figure 5:
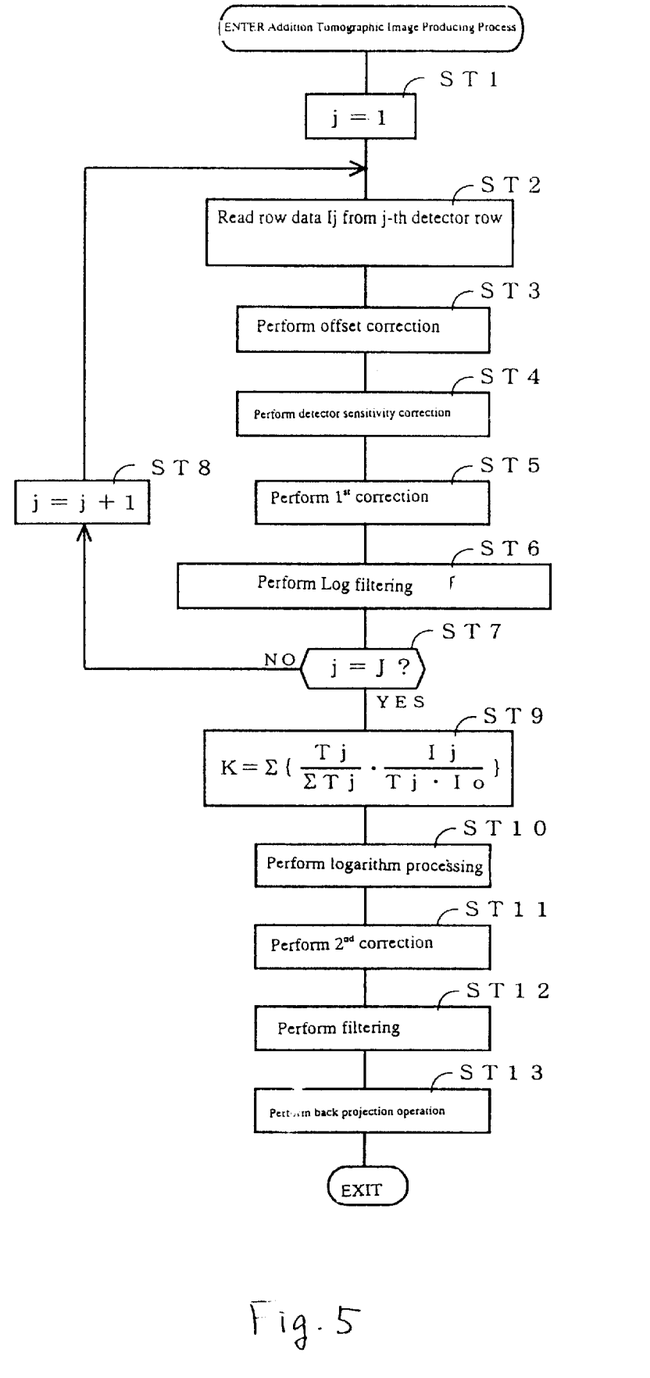
FIG. 5 is a flow chart of an addition tomographic image producing process in accordance with a first embodiment of the present invention.

FIG. 5 is a flow chart showing an addition tomographic image producing process conducted in the X-ray CT apparatus 100.

In Step ST1, an image index counter j is initialized to "1".

In Step ST2, row data Ij is read from a j-th detector row Dj in the multi X-ray detector.

In Step ST3, an offset correction is performed. Specifically, an offset is subtracted from the row data Ij of the j-th detector row Dj. For brevity of notation, the row data from which the offset has been subtracted will also be designated as Ij.

In Step ST4, a detector sensitivity correction is performed. Specifically, the row data Ij of the j-th detector row Dj is divided by an entering X-ray dose Tj·Io, wherein Tj is the slice thickness of the j-th detector row Dj, and Io is the entering X-ray dose per unit thickness.

In Step ST5, a first correction is applied to the row data Ij/(Tj·Io) subjected to the detector sensitivity correction. The first correction is a reference correction. For brevity of notation, the row data subjected to the first correction will also be designated as Ij/(Tj·Io).

In Step ST6, Log filtering is performed. Specifically, if the value of a certain channel in the row data Ij/(Tj·Io) subjected to the first correction is not more than a predefined threshold, then the value is replaced by the average value of one or more adjacent channels. Particularly, the value is replaced by the value of an adjacent channel; by the average value of adjacent channels on both sides; by the average value of the channels other than the current channel; or by the average value of two or more arbitrarily selected channels.

In Steps ST7 and ST8, Steps ST2–ST6 are repeated for j=2–J. Thus, row data I1/(T1·Io)–IJ/(TJ·Io) subjected to the first correction are obtained.

In the present embodiment, J=2, and the row data I1/(T1·Io)–I2/(T2·Io) are obtained.

In Step ST9, a weighted addition is performed on the row data I1/(T1·Io) –IJ/(TJ·Io) with a weight Tj/ΣTj corresponding to the slice thickness Tj to generate addition data K:

$$K=\Sigma\{(Tj/\Sigma Tj)\cdot(Ij/(Tj\cdot Io))\}.$$

In the present embodiment, J=2, and $$K=(T1/(T1+T2))\cdot(I1/(T1\cdot Io))+(T2/(T1+T2))\cdot(I2/(T2\cdot Io)).$$

In Step ST10, logarithm processing is performed. Specifically, –Log{K} is calculated.

In Step ST11, a second correction is applied to the addition data –Log{K} subjected to the logarithm processing. The second correction is at least one of a beam hardening correction, a water correction, a body motion correction and a helical correction. For brevity of notation, the addition data subjected to the second correction will also be designated as –Log{K}.

In Steps ST12 and ST13, filtering and a back projection operation are applied to the addition data $-\text{Log}\{K\}$ subjected to the second correction to obtain an addition CT image G.

Figure 6:
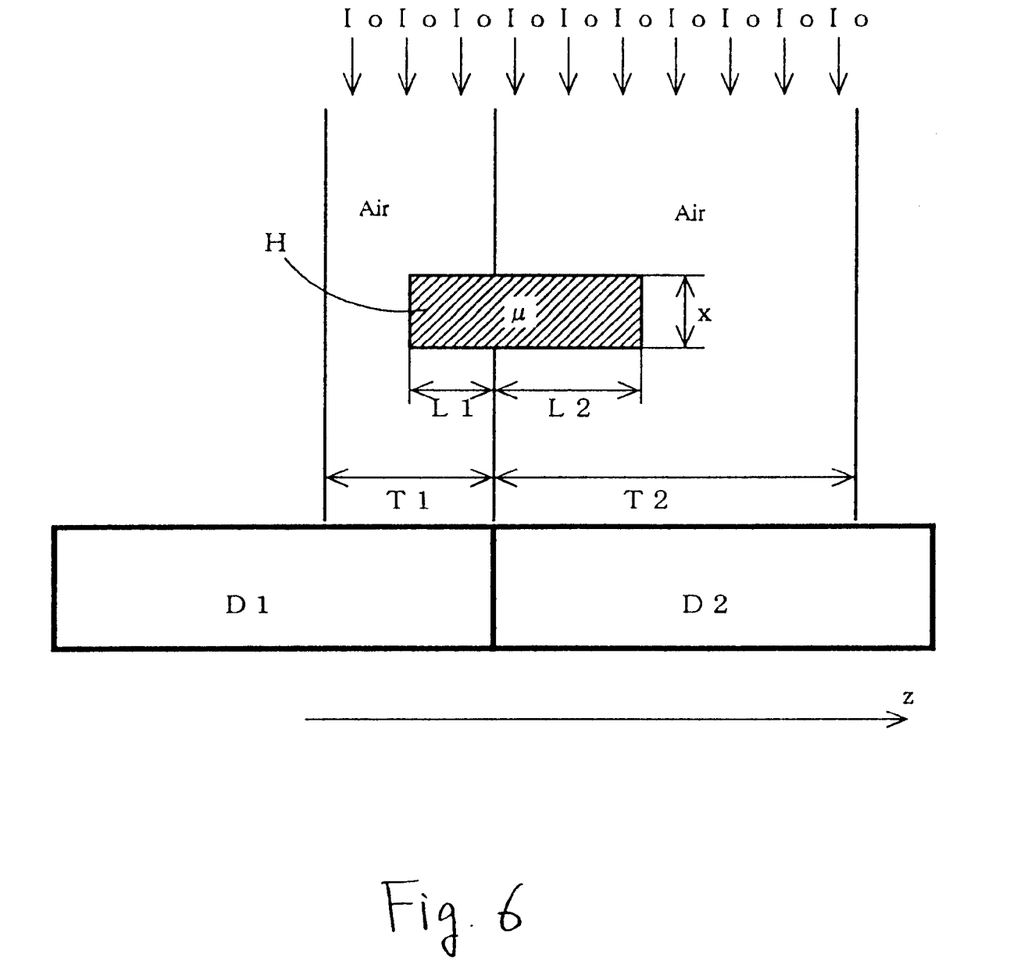
FIG. 6 is a model diagram for explaining the principle of the present invention.

FIG. 6 is a model diagram for explaining the physical meaning of the addition data K.

As shown, an intervening substance H having an absorption coefficient of $\mu$, a path distance of x and a length of (L1+L2) is present in the air. The intervening substance H is present in the slice thickness T1 of the first detector row D1 by a length of L1, and in the slice thickness T2 of the second detector row D2 by a length of L2. The entering X-ray dose per unit thickness is represented as Io.

Row data I1 obtained by the first detector row D1 is:

$$I1 = \int_0^{T1} \{Io \cdot \exp\{-\mu(z) \cdot x(z)\}\} dz$$
$$= \int_0^{L1} \{Io \cdot \exp\{-\mu \cdot x\}\} dz + \int_{L1}^{T1} \{Io \cdot \exp\{0\}\} dz$$
$$= Io \cdot L1 \cdot \exp\{-\mu \cdot x\} + Io(T1 - L1)$$
$$= Io \cdot T1(L1 \cdot \exp\{-\mu \cdot x\}/T1 + 1 - L1/T1).$$

Dividing I1 by the X-ray dose T1·Io entering the first detector row D1 for sensitivity correction gives:

$$I1/(T1 \cdot Io) = L1 \cdot \exp\{-\mu \cdot x\}/T1 + 1 - L1/T1.$$

Similarly, row data I2 obtained by the second detector row D2 is:

$$I2 = Io \cdot T2(L2 \cdot \exp\{-\mu \cdot x\}/T2 + 1 - L2/T2).$$

Dividing I2 by the X-ray dose T2·Io entering the second detector row D2 for sensitivity correction gives:

$$I2/(T2 \cdot Io) = L2 \cdot \exp\{-\mu \cdot x\}/T2 + 1 - L2/T2.$$

If the first and second detector rows D1 and D2 are regarded as one detector row Ds having a slice thickness of (T1+T2), the resulting row data Is will be:

$$Is = \int_0^{T1-T2} \{Io \cdot \exp\{-\mu(z) \cdot x(z)\}\} dz$$
$$= \int_0^{L1+L2} \{Io \cdot \exp\{-\mu \cdot x\}\} dz + \int_{L1+L2}^{T1+T2} \{Io \cdot \exp\{0\}\} dz$$
$$= Io(L1 + L2)\exp\{-\mu \cdot x\} + Io(T1 + T2 - L1 - L2)$$
$$= Io(T1 + T2)((L1 + L2)\exp\{-\mu \cdot x\}/(T1 + T2) + 1 -$$
$$(L1 + L2)/(T1 + T2)).$$

Dividing Is by the X-ray dose (T1+T2)Io entering the detector row Ds for sensitivity correction gives:

$$Is/((T1+T2)Io) = (L1+L2)\exp\{-\mu \cdot x\}/(T1+T2) + 1 - (L1+L2)/(T1+T2).$$

The weighted addition on I1/(T1·Io) and I2/(T2·Io) with respective weights T1/(T1+T2) and T2/(T1+T2) corresponding to the slice thicknesses T1 and T2 gives the addition data K:

$$K = (T1/(T1 + T2)) \cdot (I1/(T1 \cdot Io)) + (T2/(T1 + T2)) \cdot (I2/(T2 \cdot Io))$$
$$= (T1/(T1 + T2))(L1 \cdot \exp\{-\mu \cdot x\}/T1 + 1 - L1/T1) +$$
$$(T2/(T1 + T2))(L2 \cdot \exp\{-\mu \cdot x\}/T2 + 1 - L2/T2)$$
$$= (L1 + L2)\exp\{-\mu \cdot x\}/(T1 + T2) + 1 - (L1 + L2)/(T1 + T2)$$
$$= Is/((T1 + T2)Io).$$

This means that the addition data K is equivalent to the row data derived by obtaining row data Is by one detector row Ds having a slice thickness of (T1+T2) and applying the sensitivity correction to the row data Is. Therefore, no adverse effect of the partial volume will appear on the addition tomographic image G.

It should be noted that the first correction at Step ST5 may be applied to the row data Ij before the sensitivity correction (i.e., before Step ST3 or ST4), or to the addition data K before the logarithm processing (i.e., before Step ST10).

Second Embodiment

Figure 7:
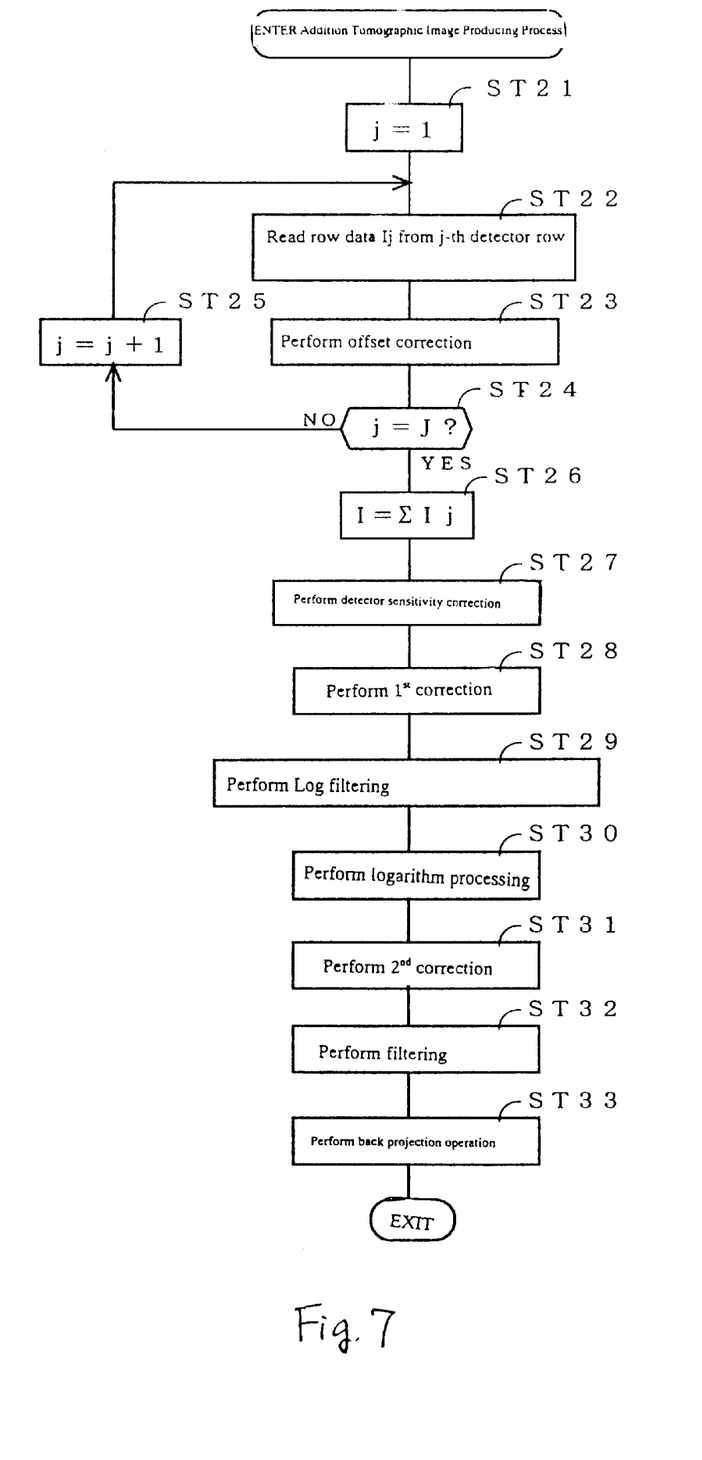
FIG. 7 is a flow chart of an addition tomographic image producing process in accordance with a second embodiment of the present invention.

FIG. 7 is a flow chart showing an addition tomographic image producing process in the X-ray CT apparatus in accordance with a second embodiment.

In Step ST21, an image index counter j is initialized to "1".

In Step ST22, row data Ij is read from a j-th detector row Dj in the multi X-ray detector.

In Step ST23, an offset correction is performed. Specifically, an offset is subtracted from the row data Ij of the j-th detector row Dj. For brevity of notation, the row data from which the offset has been subtracted will also be designated as Ij.

In Steps ST24 and ST25, Steps ST22–ST23 are repeated for j=2–J. Thus, the offset-corrected row data I1–IJ are obtained.

In the present embodiment, J=2, and row data I1 and I2 are obtained.

In Step ST26, the row data I1–IJ are simply added to generate addition data I:

$$I = \Sigma\{Ij\}.$$

In the present embodiment, J=2, and $$I = I1 + I2.$$

In Step ST27, a detector sensitivity correction is performed. Specifically, the addition data I is divided by an entering X-ray dose $\Sigma Tj \cdot Io$, wherein Tj is the slice thickness of the j-th detector row Dj, and Io is the entering X-ray dose per unit thickness.

In Step ST28, a first correction is applied to the addition data $I/\Sigma(Tj \cdot Io)$ subjected to the detector sensitivity correction. The first correction is a reference correction. For brevity of notation, the addition data subjected to the first correction will also be designated as $I/\Sigma(Tj \cdot Io)$.

In Step ST29, Log filtering is performed. Specifically, if the value of a certain channel in the addition data $I/\Sigma(Tj \cdot Io)$ subjected to the first correction is not more than a predefined threshold, then the value is replaced by a filtered value of proximate channels.

In Step ST30, logarithm processing is performed. Specifically, $-\text{Log}\{I/\Sigma(Tj \cdot Io)\}$ is calculated.

In Step ST31, a second correction is applied to the addition data $-\text{Log}\{I/\Sigma(Tj \cdot Io)\}$ subjected to the logarithm processing. The second correction is at least one of a beam hardening correction, a water correction, a body motion correction and a helical correction. For brevity of notation, the addition data subjected to the second correction will also be designated as $-\text{Log}\{I/\Sigma(Tj \cdot Io)\}$.

In Steps ST32 and ST33, filtering and a back projection operation are applied to the addition data $-\text{Log}\{I/\Sigma(Tj\cdot Io)$ subjected to the second correction to obtain an addition CT image G.

As described regarding the first embodiment with reference to FIG. 6, $$I1=Io\cdot T1(L1\cdot\exp\{-\mu\cdot x\}/T1+1-L1/T1),$$

$$I2=Io\cdot T2(L2\cdot\exp\{-\mu\cdot x\}/T2+1-L2/T2),$$

and $$Is=Io(T1+T2)((L1+L2)\exp\{-\mu\cdot x\}/(T1+T2)+1-(L1+L2)/(T1+T2)),$$

and therefore, $$I=I1+I2=Is.$$

This means that the addition data I is equivalent to the row data Is obtained by one detector row Ds having a slice thickness of (T1+T2). Therefore, no adverse effect of the partial volume will appear on the addition tomographic image G.

It should be noted that the offset correction at Step ST23 may be applied to the addition data I before the sensitivity correction (i.e., before Step ST27). In this case, respective offset values for the row data Ij are simply added beforehand, and the added value can be subtracted from the addition data I.

Moreover, the first correction at Step 28 may be applied to the addition data I before the sensitivity correction (i.e., before Step ST27).

Many widely different embodiments of the invention may be configured without departing from the spirit and the scope of the present invention. It should be understood that the present invention is not limited to the specific embodiments described in the specification, except as defined in the appended claims.

What is claimed is:

1. An addition tomographic image producing method comprising the steps of:
    applying an offset correction to data from which respective tomographic images are reconstructed;
    generating addition data by performing mathematical calculations on said data;
    applying logarithmic processing to resulting addition data; and
    performing reconstruction on said addition data to produce an addition tomographic image.

2. The method of claim 1, wherein said tomographic image is an X-ray CT image; and wherein said data is row data.

3. The method of claim 2, wherein said row data is obtained by a row detector in a multi-row X-ray detector.

4. The method of claim 2, further comprising the step of applying a reference correction to said row data before or after sensitivity correction, or to said addition data before said logarithmic processing.

5. The method of claim 4, further comprising the step of applying to said addition data at least one correction method selected from the group of correction methods consisting of beam hardening correction, water correction, body motion correction and helical correction.

6. The method of claim 4, further comprising the step of replacing a value of a certain channel with an average value of one or more adjacent channels when the value of said certain channel in said row data before said logarithmic processing is not more than a predefined threshold.

7. The method of claim 1, wherein said reconstruction is performed by the sub-steps of filtering and back projection.

8. The method of claim 1, wherein said performing of mathematical calculation comprises simple adding of data; and wherein sensitivity correction is applied to said addition data.

9. The method of claim 1, wherein said performing of mathematical calculation comprises performing a weighted addition with a weight corresponding to a slice thickness.

10. An addition tomographic image producing method comprising the steps of:
    generating addition data I by adding data Ij (wherein j=1–J) from which respective tomographic images Gj are reconstructed;
    applying an offset correction, a sensitivity correction and a logarithmic processing to said addition data I; and
    performing reconstruction on said addition data I to thereby produce an addition tomographic image G.

11. The method of claim 10, wherein said data Ij is row data obtained by a detector row in a multiple row X-ray detector.

12. The method of claim 10, further comprising the step of applying a reference correction to said addition data I before said sensitivity correction, or after said sensitivity correction and before said logarithmic processing.

13. The method of claim 10, further comprising the step of applying to said addition data I at least one correction method selected from the group of correction methods consisting of beam hardening correction, water correction, body motion correction and helical correction.

14. The method of claim 10, further comprising the step of replacing a value of a certain channel with an average value of one or more adjacent channels, when the value of said certain channel in said row data before said logarithmic processing is not more than a predetermined threshold.

15. The method of claim 10, wherein said reconstruction is performed by the sub-steps of filtering and back projection.

16. An X-ray CT apparatus comprising:
    an X-ray detector comprising a plurality of detector rows;
    means for applying an offset correction to row data Ij obtained by said detector rows;
    means for generating addition data I by performing mathematical calculations on said row data Ij;
    means for applying logarithmic processing to said addition data I; and
    means for applying filtering and back projection operations to said addition data I after being subjected to logarithmic processing.

17. The apparatus of claim 16, further comprising:
    means for applying sensitivity correction to said row data Ij.

18. The apparatus of claim 17, wherein said means for generating comprises means for performing a weighted addition to said row data after being subjected to said sensitivity ccorrection with a weight $Tj/\Sigma Tj$ corresponding to a slice thickness Tj.

19. The apparatus of claim 17, further comprising:
    first correcting means for applying a reference correction to said row data before or after said sensitivity correction, or to said addition data I before said logarithmic processing.

20. The apparatus of claim 19, further comprising a second correcting means for applying to said addition data after being subected to said logarithmic processing at least one correction method selected from the group of correction methods consisting of beam hardening correction, water correction, body motion correction and helical correction.

21. The apparatus of claim 17, wherein said means for generating comprises means for generating addition data I by adding said row data subjected to said offset processing.

22. An X-ray CT apparatus comprising:

an X-ray detector comprising a plurality of detector rows;

means for generating addition data I by adding row data Ij obtained by said detector rows;

means for applying an offset correction to said addition data I;

means for applying a sensitivity correction to said addition data I subjected to said offset correction processing;

means for applying logarithmic processing to said sensitivity corrected addition data; and means for applying filtering and back projection processing to said addition data I subjected to said logarithmic processing.

23. The apparatus of claim 22, further comprising:

first correcting means for applying a reference correction to said addition data I before said sensitivity correction or after said sensitivity correction and before said logarithmic processing.

24. The apparatus of claim 23, further comprising: second correcting means for applying to said addition data I subjected to said logarithmic processing at least one correction method selected from the group of correction methods consisting of beam hardening correction, water correction, body motion correction and helical correction.

* * * * *